AMMONIA: HYDROCARBON AZEOTROPES AT 200 PSIG.

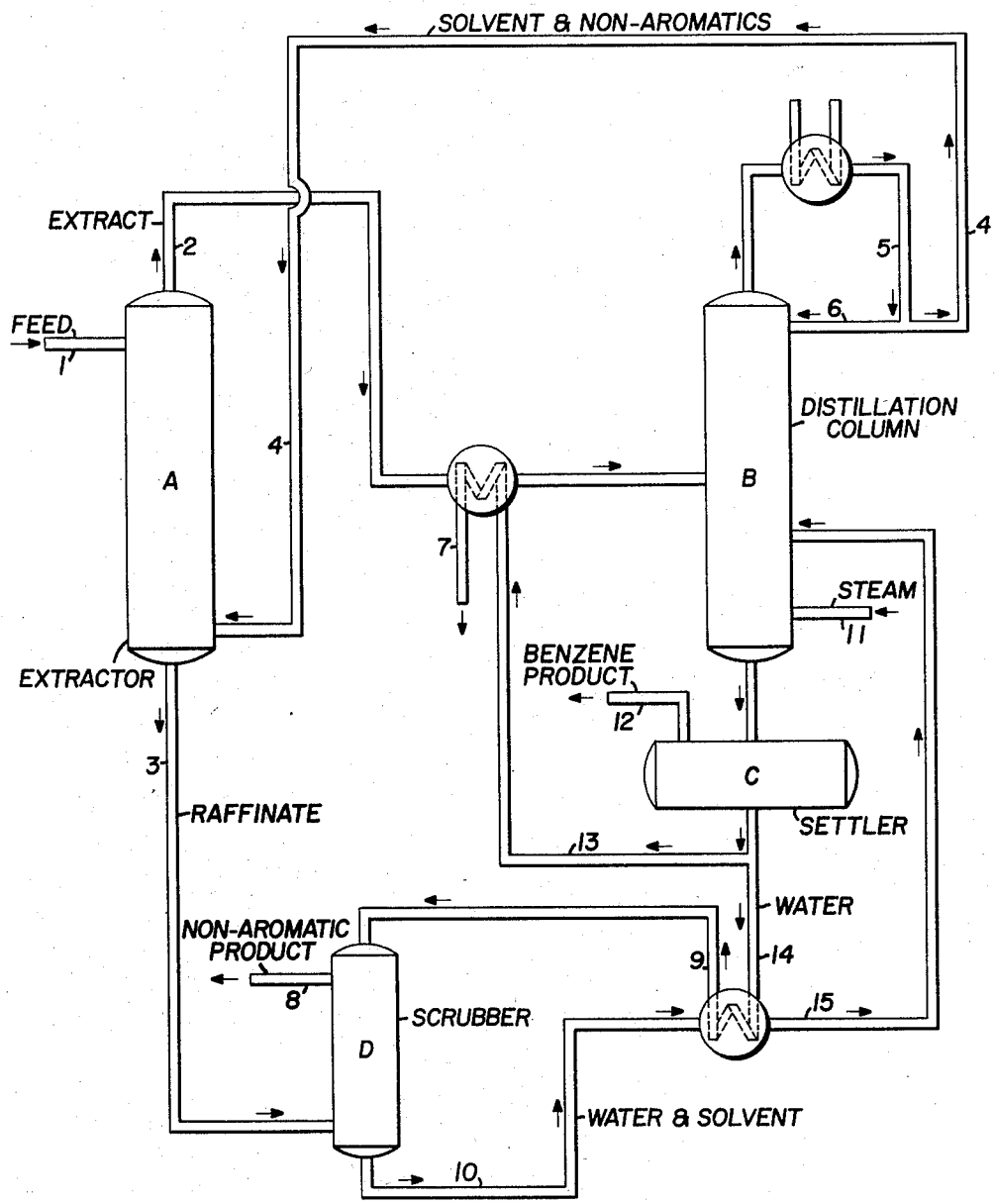

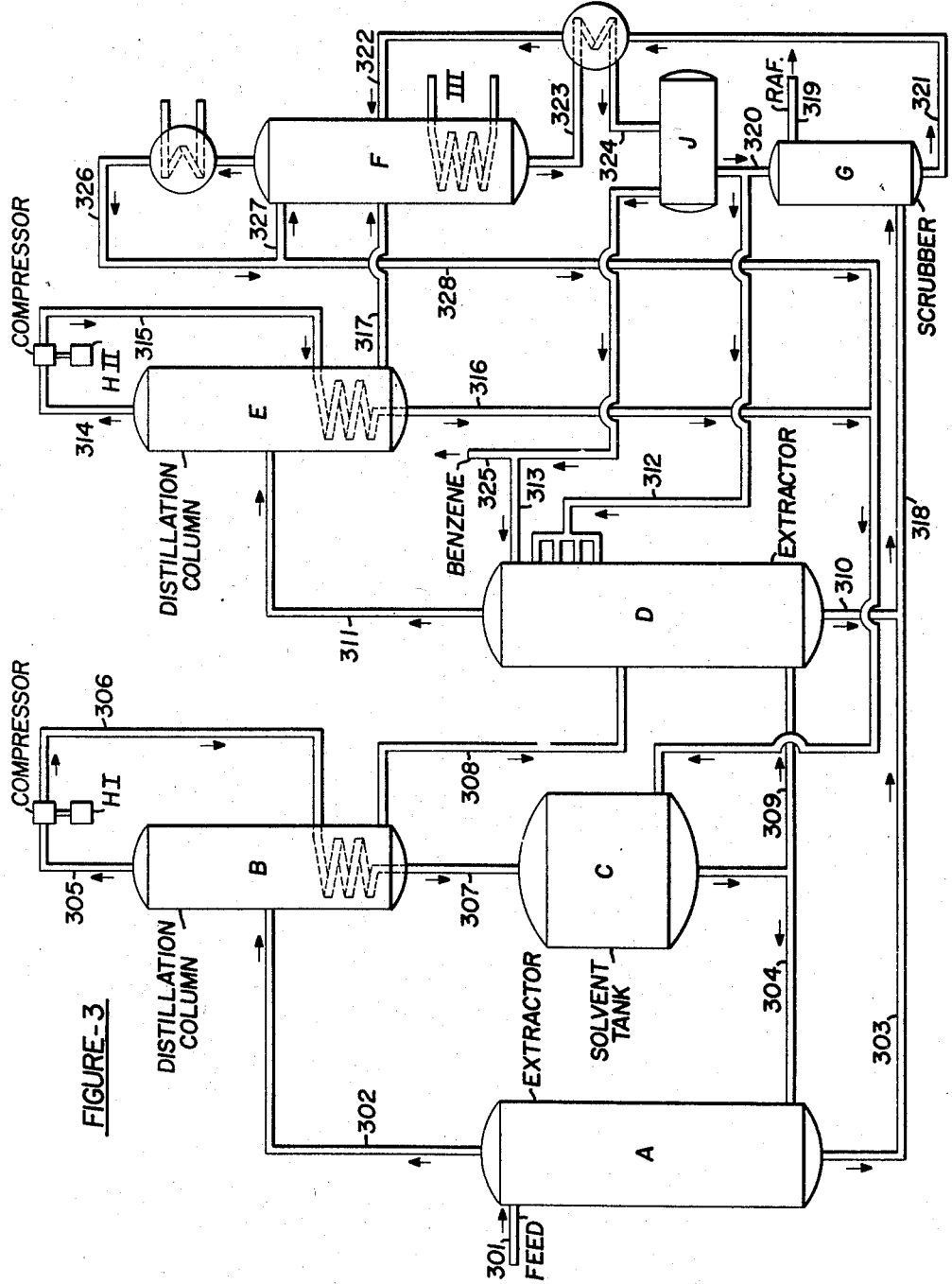

United States Patent Office 2,909,576
Patented Oct. 20, 1959

2,909,576

SEPARATION OF AROMATIC HYDROCARBONS BY SOLVENT EXTRACTION FOLLOWED BY AZEOTROPIC DISTILLATION OF THE EXTRACT PHASE

Merrell R. Fenske and Robert H. McCormick, State College, Pa., assignors to Esso Research and Engineering Company, a corporation of Delaware Application November 6, 1956, Serial No. 620,705

9 Claims. (Cl. 260—674)

This invention relates to the separation of aromatic hydrocarbons from hydrocarbon mixtures. More specifically, it relates to the separation of benzene from virgin or cracked naphthas by a process making use of azeotropic distillation in the presence of liquid ammonia. In the preferred embodiment the original feed such as a light naphtha fraction is first subjected to an extraction step wherein ammonia solvent is used to concentrate benzene in the extract phase, and the latter is then distilled for solvent recovery, leaving a high-purity benzene fraction as a residue. The solvent is thus distilled overhead in the form of the azeotrope between the ammonia solvent and the non-aromatics, and this impure solvent can then be recycled to the extraction operation without intervening purification. If necessary, the benzene fraction from the azeotropic distillation step can be further purified by another liquid extraction, by acid treatment to remove olefins, and the like.

The growing importance of aromatics such as benzene in the chemical field points to the need for an effective process for separating these aromatics from either virgin or cracked or reformed naphthas or the like. It is the object of the present invention to provide such a process. The nature, scope and operation of the invention will be apparent from the subsequent description and attached drawings.

In the drawings:

Fig. 2 shows a flow plan of an embodiment of the invention wherein essentially pure benzene is produced by a combination of extraction followed by azeotropic distillation;

Fig. 3 shows a flow plan of a more elaborate embodiment employing extraction steps both before and after the azeotropic distillation.

Figure 1:
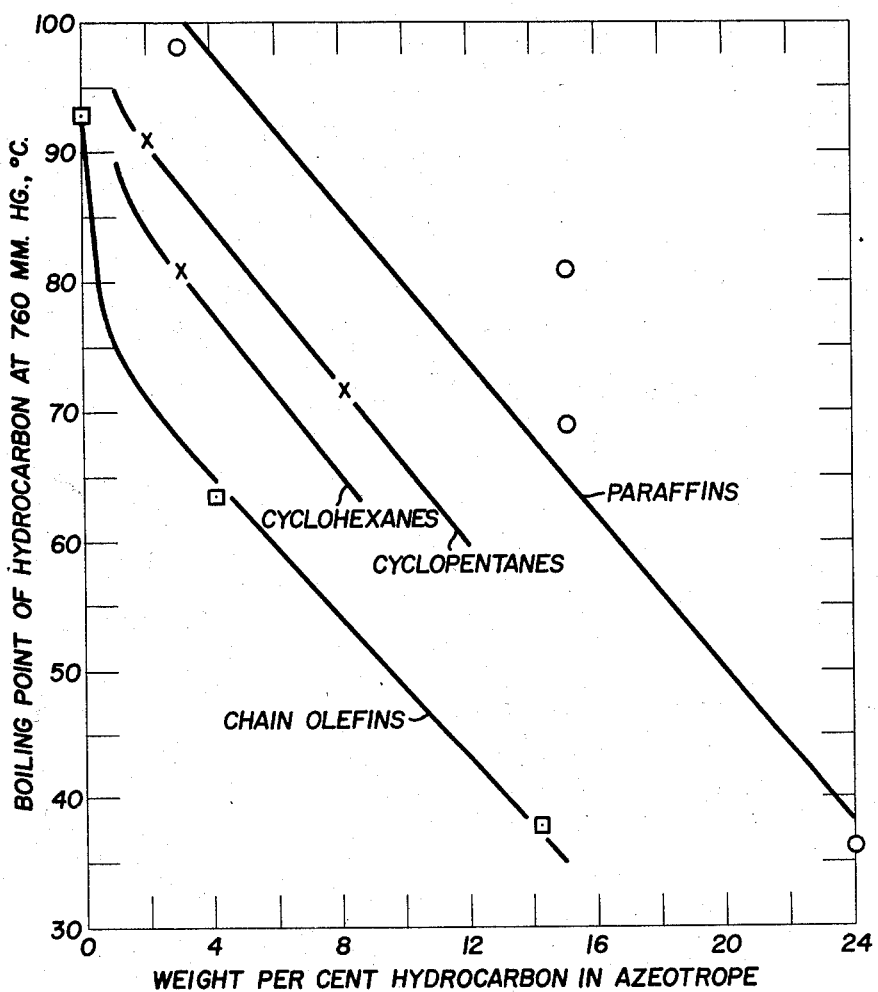
Fig. 1 shows the hydrocarbon content of ammonia:hydrocarbon azeotropes as a function of hydrocarbon boiling point.

It is well known that extraction with liquid ammonia can be used to separate an extract relatively rich in aromatic hydrocarbons from mixtures containing the latter together with other hydrocarbon types.

It has been now unexpectedly found that when mixtures of liquid ammonia and the various types of hydrocarbons are distilled, liquid ammonia forms azeotropes with non-aromatic hydrocarbons boiling up to about 195° F. and some boiling up to about 210° F., but does not form azeotropes with benzene or toluene, or, for that matter, with any other higher boiling hydrocarbons. As a result, when benzene containing hydrocarbon mixtures are distilled in the presence of ammonia, a residue enriched in benzene can be obtained. This is illustrated by the data summarized in Table I and shown in Figure 1 of the drawing. These data were obtained by distillation at 200 p.s.i.g. in a high-pressure batch fractionation column, the product being withdrawn using a 15:1 reflux ratio after having established steady-state conditions at total reflux. The composition of the product was determined by titrating it into a weighed amount of 4 N $H_2SO_4$ using methyl red as an indicator.

TABLE I

Composition of hydrocarbon/ammonia azeotropes (at 200 p.s.i.g.)

| Hydrocarbon | Boiling point of hydrocarbon at 760 mm. Hg, ° F. | Approx. weight percent of hydrocarbon in azeotrope |
|---|---|---|
| n-Pentane | 98.6 | 24 |
| n-Hexane | 155.8 | 15 |
| 2,4-dimethylpentane | 177.1 | 15 |
| n-Heptane | 209.1 | 3 |
| Methylcyclopentane | 161.4 | 8 |
| Dimethylcyclopentanes [1] | 195.8 | 2 |
| Cyclohexane | 177.4 | 3 |
| Trimethylethylene | 101.3 | 14 |
| Hexene-1 | 146.7 | 4 |
| 2,3,3-trimethylbutene-1 | 172.0 | 1 |
| Heptene-1 | 199.0 | [2] |
| Cyclohexene | 181.8 | [2] |
| Benzene | 176.2 | [2] |

[1] The hydrocarbon used for this determination was a mixture of dimethylcyclopentanes isolated from a California naphtha by vapor-liquid extraction.
[2] Non-azeotrope.

It is apparent that at a given hydrocarbon boiling point the hydrocarbon content of the corresponding ammonia azeotrope decreases as the polarity of the hydrocarbon type increases; that is, the azeotrope has the highest hydrocarbon content in the case of a paraffin, and progressively less in the case of cyclopentanes, cyclohexanes and aliphatic olefins. Cyclohexenes and aromatics form no azeotropes with ammonia. As a result aromatics such as benzene can be separated from other naphtha range hydrocarbons by azeotropic distillation with ammonia.

More specifically, it can be seen that at 200 p.s.i.g. this technique permits easy separation of benzene from paraffins having an atmospheric boiling point as high as about 210° F. such as butanes, heptanes or the more highly branched octanes; or from cyclopentanes having an atmospheric boiling point as high as 200° F. such as methylcyclopentane or dimethylcyclopentane; or from cyclohexane; or aliphatic olefins having an atmospheric boiling point up to about 175° F.

Accordingly, when benzene is to be separated from a virgin naphtha, it is desirable to prepare the feed as a fraction boiling from about 130° to 195° F. On the other hand, if benzene is to be separated from a cracked naphtha or other streams containing substantial amounts of aliphatic olefins, it is desirable to limit the end point of the feed to about 180° F., in order to eliminate the bulk of the $C_7$ olefins which form relatively lean azeotropes.

Of course, the greater the hydrocarbon concentration in the azeotrope, the less ammonia solvent will be required to effect the separation. For instance, when a feed consisting of 90% n-hexane and 10% benzene is distilled in the presence of ammonia, the azeotropic distillate will contain 15% n-hexane and 85% ammonia. Consequently, somewhat more than 500 parts of ammonia per 100 parts of hydrocarbon feed will be required to effect the separation, the total amount depending on the amount of ammonia that is withdrawn as bottoms with the aromatic concentrate. With a reflux ratio of 1 to 2, about 40 to 45 pounds of steam would be required for vaporization per pound of benzene, or using compression distillation, about 6 pounds of steam would be needed in the distillation per pound of benzene. The distillate azeotrope is then desirably cooled to temperatures below 115° F., e.g. to about 90° F., whereby it is separated into a hexane layer and an ammonia layer containing 7.5 weight percent hexane. The latter can then be reused directly as the azeotroping agent, but in such an event, of course, twice as much of the impure solvent would be needed than of pure ammonia, and thereby the minimum steam requirement would be raised to about 9 pounds per pound of benzene. Some additional steam will also normally be required for final solvent recovery from the benzene concentrate and from the settled hexane phase.

The solvent preferably is pure ammonia, although it may contain small amounts of modifying co-solvents such as methylamine or anti-solvents such as water.

The above described arrangement has been found highly effective. However, since such a separation depends exclusively on azeotropic distillation, it operates under an economic handicap because of the required high ratio of azeotropic agent to nonaromatic hydrocarbon, and also the necessity for breaking the distillate azeotrope in a separate operation. These disadvantages have been avoided in the preferred embodiment of the present invention in an unusually advantageous manner. More particularly, some of the separation is efficiently accomplished by liquid extraction and at the same time by combining the azeotropic distillation with liquid extraction, the azeotropic distillate can be recycled directly from the azeotropic distillation stage to the extraction stage without having to resolve the azeotrope into its components. Suitable processes are shown diagrammatically in Figures 2 and 3. All ratios and percentages of materials are expressed throughout on a weight basis, unless indicated otherwise.

Referring to Figure 2, the hydrocarbon feed is introduced into the upper portion of extractor A via line 1 at a rate of 100 lbs. per hour and at a temperature of about 100° F. The feed is a virgin naphtha fraction in the $C_6$ and $C_7$ boiling range, i.e. boiling between 130° and 195° F. and contains 10 percent of benzene. Solvent feed enters at the bottom of extractor A via line 4 at a rate of about 120 lbs. per hour and at a temperature of about 100° F. The solvent feed consists of 92 percent liquid ammonia and 8 percent of recycle hydrocarbon, essentially non-aromatic in nature. The entire process is operated at a pressure of about 240 p.s.i.a. The extractor performs only a stripping operation, that is, the hydrocarbon in the solvent phase leaving the feed plate is sufficiently rich in benzene for subsequent process requirements and therefore is not further enriched. A substantial advantage is thus achieved since a simple stripping operation is easier to carry out than a combined stripping and enriching operation, and can be made with a lower solvent treat. However, if the feed contains olefins having a boiling point close to that of benzene, an enriching section can be helpful since it aids in producing an extract phase materially richer in benzene and having a lower olefin content than when only a stripping section is used. The relative absence of olefins in the extract greatly facilitates separating the benzene from non-aromatics by azeotropic distillation.

A raffinate stream is withdrawn from the bottom of extractor A via line 3 at a rate of 100 lbs. per hour and at a temperature of about 100° F. This raffinate consists of about 90 percent of essentially non-aromatic hydrocarbons and 10 percent liquid ammonia, and contains less than 0.5 percent benzene based on the raffinate hydrocarbon.

The extract stream is withdrawn from the top of extractor A via line 2 at a rate of 120 lbs. per hour and at 100° F. The extract consists of about 83 percent solvent, 8.5 percent benzene and 8.5 percent non-aromatic hydrocarbon; i.e., the benzene content of the hydrocarbon portion of the extract is 50 percent. Considering that a separation factor beta of 10 can be obtained between benzene and the saturated hydrocarbons boiling in the 130° to 195° F. range and that the solubility of the hydrocarbons in the ammonia solvent equals about 17 percent at 100° F., six stages are required in extractor A to effect this separation when a solvent treat of 1.2 lbs. of liquid ammonia per lb. of fresh hydrocarbon feed is used. Since the raffinate hydrocarbon contains less than 0.5 percent benzene, the actual yield of benzene from this extraction is better than 95 percent. If about 12 to 15 stripping stages are used, essentially a 100% yield of benzene can be effected.

The extract stream 2 is next sent to distillation tower B. The ammonia solvent is removed from the extract by stripping with open steam, introduced via line 11 at a rate of 75 lbs. per hour and at a temperature of 390° F. The distillate from tower B is an azeotrope containing 92 percent ammonia and 8 percent of hydrocarbon. Under different conditions the distillate azeotrope may contain from about 2 to 10 percent of saturated hydrocarbons, but in no event is there any appreciable amount of benzene in this azeotrope, due to the non-existence of an azeotrope between benzene and ammonia. The hydrocarbon portion of the distillate normally does, however, comprise all of the paraffins, cycloparaffins and aliphatic olefins which contaminated the benzene in the extract. After condensing the distillate, a portion of it, about 60 lbs. per hour, is returned to tower B via line 6 as reflux while the remainder, about 120 lbs. per hour, is used directly as solvent feed for the extractor, being recycled to the extractor via line 4. The hydrocarbon in the solvent will not in any way interfere with the extractor separation since it contains no benzene. In fact, it also contains considerably less cycloparaffins than the hydrocarbon feed. After entering with the solvent, the non-aromatic hydrocarbons ultimately leave the extractor with the raffinate via line 3.

The bottoms from the distillation tower B is essentially a mixture of high-purity benzene and water. It is taken to separator C where the benzene layer is removed as extract product via line 12 at a rate of about 10 lbs. per hour and at a temperature of 390° F. A part of the water layer, about 30 lbs. per hour, is passed from separator C via lines 14 and 9 to scrubber D where it is used to wash ammonia from the extractor raffinate introduced via line 3. This is the only finishing step needed on the raffinate stream. The essentially benzene-free and solvent-free hydrocarbon raffinate is recovered via line 8 at a rate of about 90 lbs. per hour and a temperature of about 170° F. The ammonia-water mixture is withdrawn from scrubber D via line 10 at about 170° F. and returned to distillation column B via line 15 at a rate of about 40 lbs. per hour, so that the ammonia scrubbed from the raffinate would be recovered. The remainder of the water from separator C, about 75 lbs. per hour, is discarded or returned via line 7 to the steam plant, not shown. Heat conservation may be practiced by passing the hot water streams 13 and 14 in indirect heat exchange with streams being fed into distillation column B, such as the extract stream 2 or the aqueous solvent stream 10.

It is seen that by allowing for a 0.5 to 1 reflux ratio on distillation tower B, the steam requirements of the process amount to about 7.5 pounds of steam per pound of benzene for conventional distillation. The steam requirement can be reduced to about 1 pound of steam per pound of benzene when compression distillation of the type shown in Patent 2,723,940 is substituted for conventional distillation. One such operation will be described later in connection with Figure 3.

To summarize, the process described in Figure 2 is a combination of two operations. The first is a liquid extraction using liquid ammonia as the solvent. This extraction produces a benzene concentrate which may contain about 30 to 70 or even 90 percent benzene and correspondingly 70 to 10 percent non-aromatic hydrocarbons, as compared to a benzene concentration of perhaps 1 to 20 or more percent benzene in the hydrocarbon fraction being fed into the extractor. In this step the benzene is removed from the hydrocarbon feed in better than 90 percent yields. The second operation, which embodies the ultimate essence of this invention, is an azeotropic distillation which is carried out by distilling the ammonia-hydrocarbon extract phase from the aforementioned liquid extraction. Since the $C_5$-$C_7$ non-aromatics, i.e., paraffins, aliphatic olefins and cycloparaffins, form azeotropes with ammonia containing about 2 to 17 percent of the hydrocarbon and since the extract phase normally contains more than enough ammonia to form an azeotropic distillate with all the non-aromatics present, high-purity benzene hydrocarbon is obtained as bottoms while, importantly, the solvent-rich azeotropic distillate can be recycled directly to the extraction stage. When open steam distillation is used, the bottoms automatically separate into a high-purity benzene phase and an aqueous phase that may contain some ammonia. Otherwise an additional step may be required to strip the ammonia solvent from the benzene product.

If the separated benzene contains olefins that were not completely carried away in the azeotropic distillation, these can be removed by a further treatment such as washing with 85% sulfuric acid.

Suitable extraction pressures fall in the range of 100 to 400 p.s.i.a. Pressures above 200 p.s.i.a. have the advantage of not requiring refrigeration for condensing the solvent, whereas lower pressures have the advantage of increasing the hydrocarbon concentration of the azeotrope and to that extent tend to facilitate the desired separation. Depending on the extraction pressure, the temperature in the extraction may be between about 50° and 140° F. In the described operation no temperature gradient was imposed on the extractor, i.e. the top stages were operated at the same temperature as the bottom stages. However, if the benzene concentration in the feed is relatively low or close-boiling olefins are to be separated from the benzene concentrate prior to the azeotropic distillation, the use of a temperature gradient is helpful. Other things being equal the lower the extraction temperature, the lower the solubility of the hydrocarbons in the ammonia solvent. The lower solubility in turn results in greater selectivity and thereby allows obtaining greater concentrations of benzene in the extract phase.

The solvent-to-oil weight ratio in the extractor may be varied between about 1-to-1 and 4-to-1. Relatively high solvent treats are preferred when the benzene extraction is relatively difficult, i.e. when benzene is originally present in low concentration or when it is present together with close-boiling olefins.

The solubility of hydrocarbons in liquid ammonia can be decreased by adding a small amount of an anti-solvent to the ammonia. For instance, in order to counteract the increase in solubility due to increasing benzene concentrations in progressively higher stages in the reactor, up to 25 percent of water may be added to the ammonia solvent in the extractor in order to maintain hydrocarbon solubility in the preferred range of about 20 to 30 percent, since greater solubilities tend to reduce the selectivity of the solvent unduly.

The azeotropic distillation rate in line 4 is best controlled by a valve located in the overhead distillate line and controlled by a temperature sensing point located about two to four plates below the top of the tower. The control is arranged so that the valve closes when the temperature at the control point rises, and vice versa. The temperature at the control point is maintained about half way between the boiling points of ammonia and water, or hydrocarbon, whichever is lower.

An interesting and totally unexpected separation may also be effected by the present invention if the amount of ammonia vaporized in the distillation step is insufficient to form azeotropes with all of the non-aromatics. For instance, referring to the system illustrated in Figure 2, one would predict that if the ammonia in tower B were insufficient to form azeotropes with all of the non-aromatics, those carried off as distillate and those left behind in the aromatic-rich bottoms would be of similar composition. Such is not the case, however. Thus, when a benzene-rich ammonia extract having a paraffin:naphthene ratio of 1.2:1 is fed into tower B via line 2 and ammonia is vaporized in a ratio insufficient to carry off all the saturates in the form of azeotropes, a distillate can easily be produced having a paraffin:naphthene ratio of 2 to 1 while the saturates leaving the bottom of the distillation column with the benzene have a paraffin:naphthene ratio of 0.25 to 1. It is evident, therefore, that an entirely unexpected separation is effected even between the paraffins and the naphthenes.

This effect can be utilized in preparing a concentrated naphthene cut, as well as a purified benzene fraction in a single process. If a feed boiling in the range of about 165° to 185° F. is processed, the naphthene portion of the azeotrope may be essentially pure cyclohexane whereas if the feed is a wider boiling fraction and includes methylcyclopentane and dimethylcyclopentanes, the methylcyclopentanes will also form part of the naphthene product along with the cyclohexane. Such a separation may also be used to make a naphthene-rich feed suitable for hydroforming, etc.

In carrying out such a separation, the process previously described in connection with Figure 2 requires only relatively minor modifications. For instance, when a highly purified cyclohexane product is desired, it is preferable to use as extraction feed a petroleum fraction boiling between about 165° and 185° or 190° F., i.e. a cut fractionated to exclude therefrom any substantial amounts of the methylcyclopentanes. After extraction with ammonia in extractor A, the ammonia extract is passed to a 12- to 15-plate distillation tower B as before, but the distillation is operated so that, instead of azeotropically distilling off substantially all of the saturates overhead, the amount of hydrocarbon distilled off corresponds approximately only to the paraffins present in the extract being fed via line 2. In this case tower B is preferably heated by indirect means, e.g. a steam coil rather than open steam. In this manner, the azeotropic mixture taken off via line 4 and returned to extractor A consists of ammonia solvent admixed with non-aromatic hydrocarbons that are predominantly paraffinic in nature, e.g., about 65% hexanes and heptanes and 35% naphthenes, while the bottoms contain a benzene concentrate admixed with other hydrocarbons that are predominantly naphthenic, i.e. largely cyclohexane and some paraffins, plus the excess ammonia solvent not taken overhead. This bottoms cut from tower B is next passed to another, similar tower BB (not shown) where it is subjected to further azeotropic distillation, e.g. with open steam, driving off cyclohexane plus any other non-aromatic hydrocarbons and ammonia in the form of a second azeotropic mixture. Cyclohexane product of 75% or better purity is recovered from this second azeotropic mixture by scrubbing out the ammonia with water or the like. Simultaneously, a highly purified benzene fraction is recovered from tower BB as bottoms and processed as originally described.

It will be noted that this modification of the process differs from the one previously described in connection with Figure 2 mainly in that the amount of ammonia evaporated in tower B is not sufficient to form an azeotropic mixture with all the non-aromatic hydrocarbons present, but only with the relatively more fugitive ones, i.e. the paraffins. As already described, this result can be obtained by operating tower B in such a manner that a relatively smaller proportion of the incoming extract is vaporized, i.e. the excess ammonia present in the extract in line 4 but not needed to form the paraffin-rich azeotropic distillate, is withdrawn as part of the benzene and cyclohexane containing bottoms to be then directly subjected to another azeotropic distillation in tower BB. Alternatively, it is possible to prepare the feed to tower B in such a fashion that it has just the right proportion of ammonia to form the desired low boiling azeotropic distillate with the paraffins while being insufficient to form higher boiling azeotropic distillates containing increasing amounts of naphthenes. Such a distillation feed of relatively low ammonia content, i.e. having a relatively high hydrocarbon/ammonia ratio, can be obtained by flashing off a suitable proportion of the ammonia from the extract in line 4 ahead of tower B, or by operating extractor A at a high enough solubility level, i.e. at a high enough temperature or with relatively little water addition so that the resulting extract has the proper hydrocarbon/ammonia ratio in the first place. At any rate, when the feed to tower B has just the right proportion of ammonia to allow it all to be taken overhead as an azeotropic mixture with the paraffins, the bottoms consist essentially only of benzene, cyclohexane and a small amount of paraffins, and additional ammonia solvent must then, of course, be added thereto before these hydrocarbons can be further separated into benzene and a cyclohexane concentrate by another azeotropic distillation in tower BB.

An even more efficient separation than that described above will now be described in connection with Fig. 3, using as an example the separation of benzene from a light, hydroformed naphtha boiling between 130° and 185° F., containing, on a volume basis, 5% benzene, about 35% naphthanes and 60% paraffins.

Referring to Fig. 3, the naphtha fraction is introduced via line 301 to the top stage of extractor A at a rate of 100 lbs. per hour. Liquid ammonia solvent containing about 4.7 pounds of recycled saturated hydrocarbons per 100 pounds of ammonia proper is fed into the extractor from storage drum C via line 304 at a rate of 104.7 lbs. per hour. Extractor A operates as a stripping unit at a solvent-to-oil ratio of 1.0 to 1, at a pressure of 240 p.s.i.a. and a temperature of 100° F. A temperature of 100° to 110° F. maintains the hydrocarbon solubility in ammonia at about 15 percent throughout the extractor. At this temperature 240 p.s.i.a. is the minimum pressure required for keeping the ammonia in liquid phase, but higher pressures may, of course, be used. At the above conditions a separation factor beta between benzene and non-aromatics of about 7 is obtained. Nine theoretical extraction stages accordingly will produce a raffinate containing 0.5 volume percent benzene, making the benzene yield in the extract 90 percent. The raffinate, essentially free of benzene, is withdrawn from the extractor at a rate of 95 lbs. per hour and contains 93 weight percent hydrocarbons and 7 weight percent ammonia. The extract phase leaving extractor A via line 302 contains 15 percent hydrocarbons and 85 percent liquid ammonia. The benzene content of these extract phase hydrocarbons is 27 volume percent. It is the function of extractor A to remove the benzene from the overall naphtha cut, and to increase the concentration of benzene moderately.

The extract phase is fed to a compression distillation column B. This column operates at a top pressure of 210 p.s.i.a. Due to the azeotropic formation between ammonia and saturated hydrocarbons in this boiling range, the vapor from column B consists of 94 percent ammonia and 6 percent saturated hydrocarbon. The vapor is withdrawn at a rate of 87.3 lbs. per hour and compressed in compressor H–I to 400 p.s.i.a. which corresponds to a saturation temperature of 145° F. This compressed vapor serves as the heat source for column B. After being condensed in the reboiler coil of column B, the liquid solvent is sent to storage tank C. The bottoms are removed from column B at 210 p.s.i.a. and 115° F. via line 308 at a rate of 22.4 lbs. per hour and contains about 40 to 60 percent, e.g. 50 percent ammonia and correspondingly about 50 percent hydrocarbon. The benzene content of this hydrocarbon is 40 volume percent. Column B functions to remove the bulk of the solvent from the extract stream. In addition, the benzene content of this concentrate is further increased by the azeotrope between ammonia and saturates.

The bottoms from column B are sent to extractor D. 11.7 lbs. of the liquid ammonia solvent (equivalent to a 1 to 1 solvent/oil ratio) is introduced into the bottom of extractor D from tank C via line 309 at 100° F. and 240 p.s.i.a. This means that the solvent/oil ratio in the stripping section (below the feed) is 1 to 1, and 2 to 1 in the enriching section (above the feed). The stripping section of D is operated at 100 to 110° F. to maintain solubilities of 10 to 15 percent. Above the feed the temperature is reduced gradually to 70° F. at the top of the extractor. Additional solubility control is afforded by the injection of water at 240 p.s.i.a. via lines 312 at a rate of 4.8 lbs. per hour. This maintains the solubility in the enriching section at 20 percent as desired. To have 20 percent solubility in ammonia at 70° F. with pure benzene requires the presence of 18 percent water in the solvent. Consequently, as described before, depending on benzene concentration, operating temperatures and desired solubility, anywhere from 0 to 25 percent of water may again have to be injected into the extractor on selected stages between the feed point and the top of the extractor. Approximately 15 theoretical stages in extractor D will separate the hydrocarbon feed into an extract containing a mixture of ammonia and pure (99+ percent) benzene and a raffinate hydrocarbon phase containing from 1 to 2 volume percent benzene. The yield of benzene in the extract stream 311 from extractor D is about 95 percent of the benzene present in the feed to D. This extract stream 311 contains 65.6 percent ammonia, 14.4 percent water and 20 percent benzene, and is withdrawn from extractor D at 240 p.s.i.a., 70° F. and at a rate of 33.4 lbs. per hour. Because of the reduced quantities of both ammonia and hydrocarbon to be handled in extractor D, it is considerably smaller in diameter than extractor A.

The raffinate stream 310 is withdrawn from extractor D at a rate of 7.8 lbs. per hour. It contains 93 percent of essentially non-aromatic hydrocarbons (0.6% benzene based on total hydrocarbons present) and 7 percent ammonia, and is blended with the raffinate stream 303 (95 lbs. per hour) from extractor A for final solvent cleanup. The solvent is removed from the combined raffinate by washing with water in scrubber G. 64.8 lbs. per hour of water are injected into scrubber G via line 320. The water:ammonia mixture leaving the bottom of G and containing 10% ammonia and 90% water is taken at a rate of 72 lbs. per hour via lines 321 and 322 and, after heat exchange with bottoms 323, introduced at 240 p.s.i.a. and 350° F. into distillation tower F for the removal of the ammonia. The water:hydrocarbon mixture leaving the bottoms of distillation column F is returned via lines 323 and 324 and separator tank J to scrubber G. This bottoms stream 323 flows at a rate of 76.3 lbs. per hour and contains 8.8 percent of high-purity benzene and 91.2 percent water. It leaves tower F at 240 p.s.i.a. and 400° F. but is cooled to about 150° F. by heat exchange with the ammonia water stream 321 before being passed to settler J. Finished raffinate is recovered from scrubber G via line 319 at a rate of 95.6 lbs. per 100 lbs. of naphtha feed. This raffinate contains about 0.6 percent benzene and less than 0.1 percent of ammonia.

The extract phase leaving extractor D is fed via line 311 to compression distillation tower E. The compression distillation column E operates at a top pressure of 130 p.s.i.a. About two-thirds of the solvent is removed from the extract phase in tower E. After compression to 400 p.s.i.a. in compressor H–II (145° F. saturation temperature), and condensation in the reboiler coils, the virtually hydrocarbon-free solvent is returned via line 316 to storage tank C at a rate of 14.7 lbs. per hour. The bottoms from tower E contain 38 percent ammonia, 35 percent benzene and 27 percent water. A substantially more extensive removal of the solvent in tower E is generally not advisable since the presence of water, with a low molecular weight, rapidly increases the boiling point of the bottoms from tower E, to the detriment of the compression distillation. A 3 to 1 compression ratio is already being imposed on the vapor from E in order to supply a 25° F. temperature differential across the reboiler surface.

The bottoms are fed from tower E at 400 p.s.i.a. and 120° F. via line 317 to a conventional distillation tower F for removal of the remaining solvent. Distillation tower F operates at 240 p.s.i.a. to permit direct condensation of the distillate ammonia vapors with 100° F. cooling water. The pure ammonia distillate is sent at a rate of 14.4 lbs. per hour to storage tank C via lines 326 and 328, while 3 lbs. per hour are refluxed via line 327. The aqueous bottoms from tower F are sent to a separator J as already mentioned. This water layer is used for water injection to extractor D via line 312 and also to wash the raffinate in scrubber G as also already mentioned. About 4.4 lbs. per hour, i.e., enough of the hydrocarbon layer (99+%) benzene) to satisfy the material balance is taken as extract product via line 325. The remainder, i.e., 2.3 lbs. per hour, of this benzene layer is returned to extractor D as reflux via line 313.

Heat is required in three operations in this process, the first operation requires that 3800 B.t.u. of work per hour be supplied to the compressor H–I on column B. The compressor H–II on column E requires 1300 B.t.u. of work per hour. Both of the above figures are based on a compressor efficiency of 80%. The total compressor requirements are equal to about 3 horsepower-hours per gallon of benzene. The reboiler on column F needs 13,700 B.t.u. per hour at 420° F.

If the compressors are driven by turbines operated with steam at 1050° F. and 500 p.s.i.a., 14 pounds of steam per hour are required. This assumes, first, that the steam expands to atmospheric pressure and, second, that a turbine efficiency of 90% can be obtained. If steam at 325 p.s.i.a. is used to supply the heat for tower F, 19 pounds of steam per hour are required. Since 4.4 pounds of benzene are produced per hour by the process, the total steam requirement is 55 pounds of steam per gallon of benzene. Considering that the naphtha feed contained only 5 volume percent benzene, this steam requirement is quite reasonable. Assuming a steam cost of 50 cents per 1000 pounds, the steam cost is only 2.8 cents per gallon of benzene.

An interesting modification involves the use of a gas turbine to drive the compressors. Using an arrangement like a waste heat boiler, the exhaust gases from the turbine will supply the heat required by column F. Assuming a turbine efficiency of 15%, 34,000 B.t.u. per hour have to be supplied. Utilization of 13,700 B.t.u. per hour by the reboiler on column F, produces a thermal efficiency on the fuel of 18,800/34,000 or 55%. Allowing 10 cents per million B.t.u. as fuel cost, the heat cost for the process using the gas turbine drive would be 0.6 cent per gallon of benzene.

As used herein, the expression "unsaturated hydrocarbons" is intended to cover aliphatic olefins, cyclic olefins as well as aromatics.

Having described the general nature and advantages of the invention, and having illustrated it by examples, its scope is particularly pointed out in the appended claims.

What is claimed is:

1. In a process for separating benzene from a $C_6$–$C_7$ hydrocarbon fraction containing benzene in concentrations of at least about 1 percent in admixture with other hydrocarbons, the improvement which comprises mixing said fraction with about 100 to 400 percent by weight of a liquid ammonia solvent in a liquid extraction zone, withdrawing from said extraction zone a raffinate phase relatively rich in non-aromatic hydrocarbons, also withdrawing from said extraction zone a liquid solvent extract containing in its hydrocarbon portion about 30 to 90 percent benzene and correspondingly 70 to 10 percent non-aromatic hydrocarbons, boiling the liquid extract in a distillation zone at a pressure of about 100 to 400 p.s.i.a., withdrawing from said distillation zone an overhead fraction containing an azeotropic mixture of ammonia and non-aromatic hydrocarbons, recycling said overhead fraction to a lower portion of the liquid extraction zone, and also withdrawing from said distillation zone a residue fraction containing concentrated benzene.

2. In a process for separating benzene from a $C_6$–$C_7$ hydrocarbon fraction containing benzene in concentrations of about 1 to 20 percent in admixture with saturated hydrocarbons, the improvement which comprises contacting said fraction with about 100 to 400 percent by weight of ammonia in a liquid extraction zone, at a temperature between about 50° and 140° F. and sufficient pressure to maintain the ammonia liquid, withdrawing from the extraction zone a raffinate phase relatively rich in non-aromatic hydrocarbons, also withdrawing from the extraction zone a liquid solvent extract containing about 20 to 30% hydrocarbons dissolved in the ammonia, these dissolved hydrocarbons being composed of about 30 to 90% benzene and correspondingly 70 to 10% non-aromatic hydrocarbons, boiling the liquid extract in a distillation zone at a pressure of about 100 to 400 p.s.i. absolute, withdrawing from said distillation zone a residue fraction containing concentrated benzene, also withdrawing from said distillation zone an overhead fraction containing an azeotropic mixture of ammonia and non-aromatic hydrocarbons and recycling the azeotropic mixture to the distillation zone to supply ammonia solvent therein.

3. A process according to claim 2 wherein the raffinate phase withdrawn from the extraction zone is scrubbed with water in a scrubbing zone, the resulting mixture is separated into a non-aromatic hydrocarbon product and an aqueous ammonia phase, the aqueous ammonia phase is passed to the distillation zone, the resulting residue fraction is withdrawn from the distillation zone and separated into a benzene product phase and a water phase, and the separated water phase is recycled to the scrubbing zone.

4. A process according to claim 2 wherein the $C_6$–$C_7$ hydrocarbon feed fraction has a boiling range from about 165° to 185° and contains cyclohexane as well as paraffins but is substantially free of olefins, and wherein only enough ammonia is boiled off from the extract in said distillation zone to form an azeotropic mixture rich in paraffins but containing only a minor portion of cyclohexane, the resulting benzene rich residue is passed to a second distillation zone, said residue in the second distillation zone is heated in the presence of sufficient ammonia to boil off substantially all cyclohexane in the form of an azeotropic mixture, cyclohexane is recovered therefrom, and a highly purified benzene stream is recovered as bottoms from said second distillation zone.

5. A process according to claim 4 wherein the ammonia content of the feed being introduced into the first distillation zone is approximately sufficient to form an azeotropic mixture with the paraffins present but is not sufficient to form an azeotropic mixture with a major proportion of the cyclohexane present, and wherein extraneous ammonia is added to the distillation residue after its withdrawal from the first distillation zone in an amount sufficient to form an azeotropic mixture with the cyclohexane when distilled in the second distillation zone.

6. A process according to claim 4 wherein the heat required in said first distillation zone is supplied by means of indirect heat exchange and the heat required in the second distillation zone is supplied by open steam.

7. A process according to claim 6 wherein the ammonia content of the feed being introduced into the first distillation zone is greater than needed to form an azeotropic mixture with substantially all the paraffins present, and wherein the residue withdrawn from the first distillation zone contains enough ammonia to form with the remaining cyclohexane an azeotropic mixture when boiled in the second distillation zone.

8. A process for separating a benzene concentrate from a naphtha fraction boiling in the range of about 130 to 195° F. which comprises mixing said naphtha with about 1 to 4 times its weight of liquid ammonia in a first extraction zone, withdrawing from the first extraction zone a first raffinate containing a major proportion of essentially non-aromatic hydrocarbons and a minor proportion of ammonia dissolved therein, also withdrawing from the first extraction zone a first extract containing a mixture of about 70 to 95% ammonia and correspondingly about 30 to 5% of hydrocarbons enriched in benzene, boiling the extract in a first distillation zone at a pressure of about 100 to 400 p.s.i.a., withdrawing an ammonia-rich vapor from the first distillation zone in a proportion such that a first benzene-rich residue containing about 40 to 60% ammonia is produced, condensing the withdrawn ammonia-rich vapor and recycling it to the first extraction zone, passing the residue to a second extraction zone, mixing the residue with additional liquid ammonia solvent in a second extraction zone to give therein an ammonia/hydrocarbon ratio between 1 to 1 and 4 to 1, withdrawing from the second extraction zone a raffinate essentially free of benzene, also withdrawing an extract containing a mixture of ammonia and benzene, evaporating ammonia from said extract in a second distillation zone, withdrawing a second residue containing a mixture of benzene and ammonia solvent and recovering purified benzene therefrom.

9. A process according to claim 8 wherein the second residue contains water and is fractionally distilled in a third distillation zone to separate ammonia therefrom, the resulting third residue is separated into a benzene product fraction and a water fraction, a portion of this water fraction is recycled to the second extraction zone to maintain hydrocarbon solubility throughout the second extraction zone between about 20 and 30%, combining the aforementioned first and second raffinates, scrubbing the combined raffinates with another portion of the aforesaid water fraction in a scrubbing zone, passing the resulting aqueous ammonia washings from the scrubbing zone to the aforesaid third distillation zone, and recovering a raffinate hydrocarbon product from said scrubbing zone.

References Cited in the file of this patent

UNITED STATES PATENTS

| | | |
|---|---|---|
| 1,893,733 | Deanesly | Jan. 10, 1933 |
| 2,085,546 | Roelfsema | June 29, 1937 |
| 2,290,636 | Deanesly | July 21, 1942 |
| 2,371,350 | Nutting et al. | Mar. 13, 1945 |
| 2,396,299 | Sweeney et al. | Mar. 12, 1946 |
| 2,463,479 | Denton et al. | Mar. 1, 1949 |
| 2,711,433 | Poffenberger | June 21, 1955 |
| 2,721,164 | Fenske | Oct. 18, 1955 |
| 2,723,940 | Fenske et al. | Nov. 15, 1955 |
| 2,792,332 | Hutchings | May 14, 1957 |